United States Patent [19]

Ashe

[11] 4,304,407
[45] Dec. 8, 1981

[54] SEAL ASSEMBLY

[76] Inventor: Eugene F. Ashe, 1893 Galbreth Rd., Pasadena, Calif. 91104

[21] Appl. No.: 99,119

[22] Filed: Nov. 30, 1979

Related U.S. Application Data

[63] Continuation of Ser. No. 906,501, May 16, 1978, abandoned.

[51] Int. Cl.³ .............................................. F16J 15/38
[52] U.S. Cl. ....................................... 277/40; 277/47; 277/65; 277/86; 277/91; 308/36.1
[58] Field of Search ...................... 277/38-41, 277/47-51, 65, 81 R, 82, 85, 86, 91, 92, 93 R, 93 SD, 96, 96.1, 96.2; 308/36.1, 187.1, 187.2

[56] References Cited

U.S. PATENT DOCUMENTS

| | | | |
|---|---|---|---|
| 1,528,334 | 3/1925 | Hurd | 277/81 |
| 1,851,076 | 3/1932 | Ackerman | 277/65 X |
| 1,978,689 | 10/1934 | Peters | 277/81 X |
| 2,023,206 | 12/1935 | Olson | 277/81 X |
| 2,422,007 | 6/1947 | Gilbert | 277/41 |
| 2,425,209 | 8/1947 | Snyder et al. | 277/96.2 |
| 2,470,419 | 5/1949 | Voytech | 277/81 X |
| 2,479,236 | 8/1949 | Hanson | 277/86 X |
| 2,698,195 | 12/1954 | Pollard | 277/81 |
| 2,835,515 | 5/1958 | Solari | 277/38 |
| 2,844,393 | 7/1958 | Jensen | 277/40 X |
| 2,979,348 | 4/1961 | Rosniansky | 277/38 |
| 3,536,333 | 10/1970 | Gits et al. | 277/38 X |
| 3,601,413 | 8/1971 | Darnell | 277/96.2 |
| 3,672,689 | 6/1972 | Hadley | 277/38 |
| 3,914,072 | 10/1975 | Rowley et al. | 277/65 X |

FOREIGN PATENT DOCUMENTS

| | | | |
|---|---|---|---|
| 2252409 | 6/1973 | Fed. Rep. of Germany | 277/96.2 |
| 651299 | 3/1951 | United Kingdom | 277/81 |
| 933389 | 8/1963 | United Kingdom | 277/81 |

*Primary Examiner*—Robert S. Ward, Jr.
*Attorney, Agent, or Firm*—Nilsson, Robbins, Dalgarn, Berliner, Carson & Wurst

[57] ABSTRACT

A seal apparatus is provided for sealing a fluid in a stationary housing apparatus having an orifice through which a rotatable shaft extends. A bearing member with an optically flat bearing surface rotates with the shaft inside the housing. A rotationally static bearing, also having an optically flat bearing surface, extends into the housing and surrounds the shaft so that the respective optically flat bearing surfaces are positioned adjacent to each other to form a dynamic seal. The dynamic seal is maintained by external apparatus which continuously applies a uniform pressure to the static bearing thereby forcing its optically flat bearing surface against the rotating optically flat bearing surface. The junction between the stationary housing apparatus and the rotationally static but axially movable bearing is sealed by an "O" ring seal held in a circumferential groove around a cylindrical surface defining the orifice in the housing through which the rotationally static bearing extends.

9 Claims, 2 Drawing Figures

SEAL ASSEMBLY

This is a continuation of application Ser. No. 906,501, filed May 16, 1978, now abandoned.

BACKGROUND OF THE INVENTION

The present invention relates to seals and, in particular, to seals utilized with highly corrosive fluids and to apparatus for protecting the internal components from failure due to corrosion by the contained corrosive fluids.

Seals for sealing a fluid in a stationary container or housing through which a rotating shaft extends are well known in the art. Such seals generally incorporate a dynamic seal which basically comprises a rotationally static bearing member with a optically flat bearing surface positioned against a rotating bearing member with a facing optically flat bearing surface. Pressure is applied to one of the bearing members to constantly press the two optically flat bearing surfaces together to prevent fluid from leaking through the joint between them.

Seals of this type may have the pressing apparatus either attached to rotate with the shaft or fixed to the housing and stationary relative to the shaft. In either configuration, such seals generally have a primary or dynamic seal junction as well as at least two additional secondary seals which are rotationally stationary and which generally are of the "O" ring, wedge or bellows type.

In prior art seals of this type, all of the components are generally placed in the interior of the fluid housing thereby exposing the various springs, diaphragms and secondary seals to the fluid being pumped. Although placement of the seal in the interior of the housing allows the fluid pressure to aid in making the dynamic seal tight and thus leak-proof, when highly corrosive fluids are contained in the housing such seals deteriorate rapidly requiring frequent replacement. Attempts have been made to circumvent this problem by making the various components out of exotic materials which are highly resistant to the corrosive effects of the fluid. However, such an approach merely retards the rate of deterioration since the various components of the seal remain exposed to the corrosive fluid and entails extreme and at times prohibitive costs.

In another approach, illustrated by the configuration of the Chesterton 770 Seal made by A. W. Chesterton Co. of Stoneham, Mass., (shown in Chesterton Catalog C-121 English 40 M 8-73) the springs pressing the bearing surfaces against each other are isolated from the fluid by an arrangement of static seals. However, the springs are still positioned in the interior of the housing so that if a static seal fails or leaks the springs will be exposed to the corrosive fluid. Furthermore, this arrangement generally requires at least two static seals which are partially exposed to the fluid and thus subject to the corrosive effects of the fluid.

By constrast, the present invention provides a seal in which the vital parts, particularly the spring assemblies, are positioned outside of the chamber or housing containing the fluid and thus can never be exposed to the fluid during the life of the seal.

Furthermore, the present invention provides an arrangement that requires only a single "O" ring or static-type seal and may be easily positioned to protect the rotating shaft from exposure to the fluid. In addition, by positioning the seal substantially externally to the housing containing the fluid, replacement may be accomplished much more easily and quickly without dismantling the housing itself, particularly where the rotatable bearing member attached to the shaft does not need to be replaced. This may be accomplished by simply unhooking the motive means, such as a motor, from the shaft and then simply removing a plate on the end of the seal, after which all of the internal components of the seal may be easily removed and replaced.

The use of the term "rotationally static" to describe the bearing member not attached to the shaft, generally indicates that that bearing member does not rotate relative to the "O" ring seal in the orifice of the housing. However, it will be appreciated that in some embodiments such rotation, to a very slight degree, may occur when the rotation of the shaft starts, particularly in case where high initial torques are involved.

Another family of seals, produced by Crane Packing Company, and illustrated by the Roll Neck seal disclosed in Bulletin S-208 distributed by that company, provides a sealing apparatus in which the springs and other mechanical parts may be positioned outside of the housing and, thus, outside of possible contact with the fluid. However, the Roll Neck seal and other similar seals were designed for the specific purpose of eliminating mechanical contact between the shaft and the non-rotating parts for the purpose of reducing wear and prolonging seal life.

In the functioning of these seals, the relative movement between the bearing surfaces cause them to wear away thus causing the static bearing member and the "O" ring seal positioned in a groove in the static bearing member to move slowly towards the interior of the housing under the pressure provided by the pressing apparatus. The circumferential sealing surface against which the "O" ring seal presses is fixed to the housing and remains stationary with the portion of the sealing surface in the interior of the housing exposed to and subject to corrosion by the corrosive fluid. Thus, as the seal moves inward, it will come in contact with a corroded and irregular sealing surface in the interior of the housing. It is thus apparent that leakage and even premature failure of the seal will occur because of the poor seal which usually results as the "O" ring seal presses against the irregular, corroded surface. Furthermore, a greater portion of the "O" ring seal itself will be exposed to the fluid as inward movement occurs thus accelerating the seal's deterioration and eventual failure.

By contrast, the present invention provides a channel or groove for retaining the "O" ring seal in the seal housing rather than in the static bearing member. Consequently, as the rotationally static bearing member moves inward as the bearing surfaces are worn away, the "O" ring seal remains stationary. Furthermore, the outside cylindrical (non-bearing) surface of the rotationally static bearing member becomes the sealing surface rather than circumferential surface of the housing orifice. Thus, as the static bearing member moves inward, the "O" ring seal comes in contact with a portion of the cylindrical surface of the bearing which was previously on the outside of the housing and thus not previously exposed to or corroded by the corrosive fluid. Consequently, the new sealing surface is smooth without deposits or damage thereby allowing the present invention to provide a leak-free seal for substantially longer periods of time without replacement. Another advantage of this arrangement is that only a minimum portion of the "O" ring seal is exposed to the corrosive fluid thereby prolonging its life. Thus, a significant distinction over the prior art and advantage of the present invention is that the static "O" ring seal is in a groove in a member other than one of the bearing members. Thus, the bearing member surface in contact with the "O" ring moves longitudinally relative to the "O" ring seal so that a portion of the bearing surface not previously exposed to the fluid comes in contact with the "O" ring seal as the bearing surface wears away.

Still another advantage of the present invention is that because the "O" ring remains stationary, the inward motion of the rotationally static seal member tends to dislodge any particle deposits that are on the "O" ring seal itself by pushing them inwardly away from the "O" ring seal resulting in longer "O" ring seal life. By contrast, it will be appreciated that the arrangement in the Roll Neck seal tends to push deposits toward the "O" ring seal inhibiting dislodging of particle deposits and shortening the life of the "O" ring seal.

In view of the above distinctions and previously unrecognized and significant advantages, it is clear that the present invention is neither taught nor disclosed in the family of Crane seals (Crane Packing Company Bulletin No. S-2016) or any of the other prior art seals disclosed above, since the problem of corrosion and damage to the sealing surface against which the "O" ring seal presses was not appreciated.

SUMMARY OF THE INVENTION

The present invention comprises a seal apparatus for sealing a fluid in a housing apparatus through which a rotatable shaft extends. The shaft apparatus has a first bearing surface positioned in the interior of the housing apparatus. The seal apparatus comprises a seal retaining means attached to the housing apparatus with the circumferential inside surface having a circumferential groove therein. A tubularly shaped rotationally static bearing member extending through the orifice and around the shaft apparatus is axially movable relative to the shaft apparatus, and has a second bearing surface positioned adjacent to and facing the first bearing surface. Pressing means are also provided for pressing the second bearing surface against the first bearing surface thereby providing a dynamic seal between the fluid containing portion of the housing apparatus and the exterior non-fluid containing portion of the housing apparatus. Finally, a rotationally static seal means is positioned in the circumferential groove in the circumferential inside surface of the seal retaining means for sealing the junction between the circumferential inside surface of the seal retaining means and the rotationally static bearing member.

In the preferred embodiments, the second bearing surface is preferably a graphite composition while the first bearing surface may be either ceramic or metal. Both bearing surfaces are preferably optically flat.

The pressing means is preferably one or more springs which provide a constant uniform force against the rotationally static bearing member to prevent damage to the bearing surfaces during rotation due to misalignment.

BRIEF DESCRIPTION OF THE DRAWINGS

The invention will be better understood from the detailed description below taken in conjunction with the drawings wherein like reference characters refer to like parts throughout and in which.

DETAILED DESCRIPTION

Figure 1:
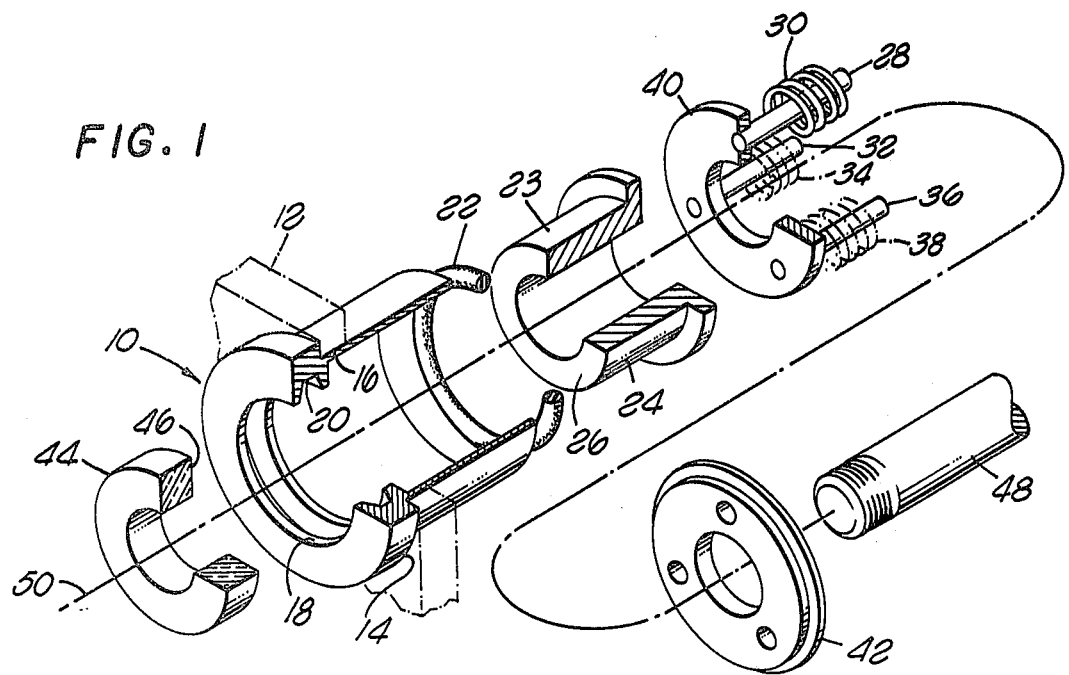
FIG. 1 is an exploded perspective view showing the various components of the preferred embodiment of the present invention.

Referring first to FIG. 1, a seal retaining member 10 is positioned in a first orifice 16 of a housing 12. The junction between the seal retaining member 10 and the housing 12 about the edge of the first orifice 16 is fixed and immovable. Such an immovable joint may be sealed by any number of techniques well known in the art to prevent fluid from seeping through the junction between the seal retaining member 10 and the housing 12. It will be appreciated, of course, that in one embodiment the seal retaining member 10 may be integral with the housing 12 thereby eliminating a separate seal retaining member. The seal retaining member 10 defines a second orifice 18 of a smaller diameter than the first orifice 16.

Passing through the second orifice 18 in the seal retaining member 10 is a rotationally fixed bearing member 24 preferably having an optically flat bearing surface 26 made of a graphite composition which is positioned in the interior of the housing 12. In order to seal the junction between the cylindrical surface of the rotationally fixed bearing member 24 and the circumferential surface defining the second orifice 18, a circumferential channel or groove 20 is provided in the seal retaining means 10 into which an "O" ring seal is placed to provide a rotationally static, axially movable seal. Thus, fluid in the interior of the housing 12 is prevented from leaking out through the second orifice 18 between the rotationally fixed bearing member 24 and the seal retaining member 10. It will be appreciated that while the seal retaining member 10 is rotationally and axially fixed relative to the housing 12 thus requiring a rotationally and axially static seal, the rotationally fixed bearing member 24 can move axially through the second orifice 18. Thus, the "O" ring seal 22 must allow axial movement through the second orifice 18.

A rotatable bearing member 44 is attached to the shaft 48 and rotates therewith. Although the rotatable bearing member 44 is preferably a separate member, it will be appreciated that it may be an integral part of the shaft 48. The rotatable bearing member 44 also has an optically flat bearing surface 46 positioned so that when the rotationally fixed bearing member 24 extends through the second orifice 18 in the seal retaining means 10, the optically flat bearing surface 26 will be adjacent to and pressing against the optically flat bearing surface 46. The optically flat, rotatable bearing surface 46 pressing against the optically flat rotationally static bearing surface thus provides a dynamic seal.

In order to provide a sufficiently tight dynamic seal, means is provided for applying pressure to the rotationally static bearing member 24. While the means for applying force can take any one of a number of configurations, in the preferred embodiment three spring apparatus are equiangularly positioned about the periphery of the shaft 48. Each spring apparatus includes a spring retainer around which is coiled a spring in a compressed state.

For example, in FIG. 1, a spring 30 is coiled in a compressed state about a spring retainer rod 28, a second spring 34 is coiled in a compressed state about a second spring retainer rod 32 and a third spring 38 is coiled in a compressed state about a third spring retainer rod 36. The spring retainer rods 28, 32 and 36 are fixed to a spring retainer positioning plate 40 to maintain the springs 30, 34 and 38 equiangularly positioned about the periphery of the shaft 48. The spring retainer rods 28, 32, and 36 also pass through holes in a retainer end plate 42 allowing the spring retainer rods, the spring retainer positioning plate 40 and the rotationally fixed bearing member 24 to move axially relative to the rotational axis 50 of the shaft 48. The retainer end plate 42 is then fixed to the end of the seal retaining means 10.

It will be appreciated that the "O" ring seal 22 remains stationary in the circumferential groove 20. Furthermore, the cylindrical sealing surface 23 against which the seal 22 presses to prevent the fluid from passing through the orifice 18, moves inward axially as the second optically flat bearing surface 26 wears down. Unlike previous seals, however, as the bearing member 24 moves inward, a portion of the cylindrical sealing surface 23, not previously in contact with the fluid in the housing 12, will come in contact with the "O" ring seal 22. This new cylindrical portion is consequently smooth and free from the effects of the corrosive fluid inside the housing 12, thereby providing a superior, longer-lasting and leak-free sealed junction.

Figure 2:
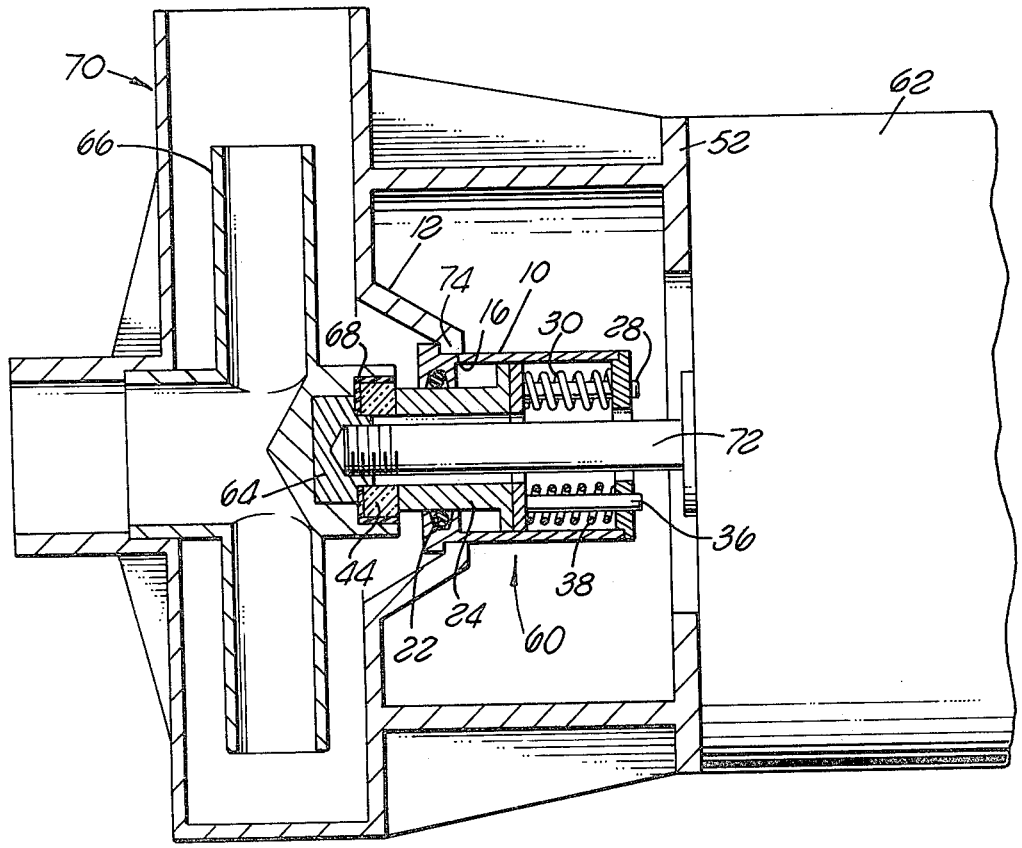
FIG. 2 is a cross-sectional plan view of the seal assembly of the present invention as utilized in a pump application.

Referring now to FIG. 2, a cross-section of the seal, shown as it is incorporated in a pump apparatus, comprises a motor 62 mounted to mounting brackets 52 which are coupled to a pump housing and motor bracket assembly 70. The motor 62 has a shaft 72 extending through an orifice in the pump housing and motor bracket assembly 70. An impeller apparatus 66 is fixed to the end of the shaft 72 with a nut 64. The nut may be fixed to the impeller 66 before being screwed onto a threaded end of the motor shaft 72. The rotatable bearing member 44 may be a ceramic or metal ring which is fixed to the motor shaft 72.

In a preferred embodiment, the rotatable bearing member 44 may be fixed to the impeller 66 by pressing the rotatable bearing member into a circular depression in the impeller 66. The bearing 44 and the impeller 66 are then made immovable utilizing a rubber cup 68. The shaft is then screwed into the nut 64, also fixed to the impeller 66, so that the bearing member 44 is circumferentially positioned about the shaft 72. Of course, it will be appreciated that many other arrangements may be utilized to fix the rotating bearing surface which is positioned to engage the bearing surface of a stationary bearing member to provide a dynamic seal.

The orifice 16 in the pump housing 70 through which the motor shaft 72 passes may be an extended portion of the housing having a lip portion 74 against which the seal retaining means 10 is placed. The rotationally static bearing member 24 then extends through the orifice defined by the seal retaining means 10 with an "O" ring seal 22 placed in the circumferential channel 20 provided in the orifice of the seal retaining means 10. The spring and the spring retainer assembly means is then provided to apply a force to the rotationally static bearing member 24 to press the optically flat bearing surface 26 of the rotationally static bearing member 24 against the optically flat bearing surface 46 of the rotatable bearing member 44 (see FIG. 1).

As previously discussed, the rotationally static bearing member 24 may be made of a graphite composition. At the least, it is preferable that the bearing surface 26 be of a graphite composition. In addition, the bearing surface 46 may be made of ceramic or metal material.

Thus, the preferred embodiment comprises a seal assembly in which all essential and movable parts, with the exception of the rotationally static bearing member 24, are placed outside of the housing and, thus, are not exposed to fluids which are contained in the housing. Consequently, the preferred embodiment of the present invention permits non-exotic ordinary materials to be utilized for those components with only the "O" ring seal possibly having an exotic or specialized resistance built into the material. Furthermore, it will be appreciated that since the seal retaining means is immovably fixed to the housing in the preferred embodiment material which has a high shear strength is not required and inexpensive plastics, which are resistent to the corrosive fluid, may be used.

Although the preferred embodiment of the invention has been particularly described with reference to the seal retaining member being attached to the housing and the rotatable bearing member being fixed to rotate with the shaft, it will be appreciated that the entire seal assembly 60 including the seal housing 10, the spring assemblies, the "O" ring seal 22 and the bearing 23 may be reversed and attached to the shaft to rotate with the shaft. A bearing like the rotatable bearing 44 may then be non-rotatably attached to the housing 12. In such an embodiment, the various parts of the spring retainer rods may be eliminated or otherwise provided so that they do not extend through the back plate 42 (FIG. 1) of the seal assembly 60 and thus exposed to the fluid. In this embodiment, it is also preferable that the back plate 42 have no orifice and that the shaft terminate inside the seal in a manner similar to its termination in the rotatable bearing member 44.

In this second embodiment, the "O" ring seal will still come in contact with a new surface not previously exposed to corrosive fluid as the bearing surface wears. Thus, the present invention, even when in an internal configuration similar to that of the Chesterton 770, still provides significant and prolonged seal life. It will be appreciated that in the Chesterton 770 configuration as the bearing surfaces wear and the carbon face bearing moves longitudinally, the "O" ring seal will come in contact with a surface previously exposed to the fluid.

While the above invention has been described with particular reference to specific illustrations, it will be appreciated that many variations and modifications can be made without departing from the spirit of the present invention and that the above description should be taken in an illustrative sense and not in a limiting one.

What is claimed is:

1. A unitary seal apparatus for sealing a fluid inside a housing and preventing the fluid from contacting both a rotatable shaft extending through the housing and the internal parts of the seal apparatus and wherein the shaft is enclosed at one end in sealing engagement with a first bearing member having a first bearing surface, said seal apparatus comprising:

a second bearing member having a second bearing surface positioned adjacent to and facing the first bearing surface, said second bearing member having an orifice through which the shaft passes whereby the shaft is isolated from the fluid;

seal retaining means for providing a fixed seal between the seal retaining means and the housing and a rotationally static but longitudinally movable seal between the seal retaining means and the second bearing member; and means for pressing the first bearing surface and the second bearing surface together to provide a dynamic and static seal between the fluid containing portion of the housing and the non-fluid containing portion of the housing, said pressing means operating in a linear manner on the second bearing surface.

2. A unitary seal apparatus for maintaining a fluid on one side of a housing and isolating the fluid from the internal parts of the seal apparatus and from a rotatable shaft extending from the other side of the housing, the housing having an aperture through which said rotatable shaft is allowed to pass to the one side of said housing, said shaft being enclosed at one end in sealing engagement with a rotatable bearing member having a first bearing surface positioned on the one side of said housing, said seal apparatus comprising:

seal retaining means adapted to be attached in sealing engagement to the housing in said aperture, the seal retaining means having an annular inside surface defining a first orifice, the annular inside surface having an annular groove therein;

a rotationally static bearing member extending through the first orifice and having a second orifice through which the shaft is allowed to pass, the rotationally static bearing member being axially movable relative to the seal retaining means and having a second bearing surface adapted to be positioned adjacent to and form a dynamic and static seal with the first bearing surface;

means within the seal retaining means for pressing the second bearing surface against the first bearing surface to provide the dynamic and static seal, the dynamic and static seal separating the fluid on the one side of the housing from the other side of the housing, said pressing means operating in a linear manner on the second bearing surface; and, rotationally static seal means positioned in the annular groove of the seal retaining means, the rotationally static seal means providing a seal between the annular inside surface of the seal retaining means and the rotationally static bearing member.

3. The seal apparatus of claim 2 wherein the seal retaining means further comprises a retaining portion having an end surface and the pressing means comprises at least one spring in a partially compressed configuration positioned between the end surface and the rotationally fixed bearing member in linear pressing relationship for maintaining a leak-free dynamic and static seal as the first and second bearing surfaces are worn.

4. The seal apparatus of claim 3 wherein the pressing means comprises three springs equiangularly positioned around the periphery of the shaft.

5. The seal apparatus of claim 4 wherein the seal housing means is comprised of a corrosion resistant thermoplastic.

6. A seal apparatus for sealing a fluid in a housing through which a rotatable shaft apparatus extends, the shaft apparatus having a shaft enclosed at one end in sealing engagement with a bearing portion, the bearing portion having a first bearing surface positioned in the interior fluid containing portion of the housing apparatus, the seal apparatus comprising:

seal retaining means attached in sealing engagement to the housing apparatus, the seal retaining means having a circumferential inside surface defining an orifice, the circumferential inside surface having a circumferential groove therein;

a rotationally static bearing member extending through the orifice and around the shaft, said rotationally static bearing member being axially movable relative to the shaft apparatus, the rotationally static bearing member having a second bearing surface positioned adjacent to and facing the first bearing surface;

means for pressing the second bearing surface against the first bearing surface to provide a dynamic and static seal, said pressing means operating in a linear manner on the second bearing surface to seal the fluid containing portion of the housing apparatus and the non-fluid containing portion of the housing apparatus; and, rotationally static seal means positioned in the circumferential groove in the circumferential inside surface of the seal retaining means for sealing the junction between the circumferential inside surface of the retaining means and the rotationally static bearing member.

7. The seal apparatus of claim 6 wherein the means for pressing comprises at least one spring positioned outside the housing apparatus in a partially compressed state for applying force to one end of the rotationally static bearing member extending from the interior of the housing apparatus.

8. The seal apparatus of claim 6 wherein the rotationally static seal means comprises an "O" ring-type seal positioned in the circumferential retaining groove.

9. A seal apparatus for sealing a fluid in a housing apparatus having an orifice through which a rotatable shaft apparatus extends, comprising:

dynamic and static seal means positioned in the interior of the housing, said dynamic and static seal means comprising a first member attached in sealing engagement to the end of the shaft apparatus and a second member positioned adjacent to the first member, the second member being rotationally static and axially movable relative to the shaft apparatus, the second member having a cylindrical surface extending through the housing apparatus orifice and around the shaft apparatus;

static seal means for sealing the junction between the cylindrical surface of the second member and the housing apparatus, the static seal means comprising a flange bearing in sealing engagement against the housing apparatus orifice, a circumferential groove, and a seal positioned in the circumferential groove and bearing against the cylindrical surface of the second member; and, means operating in a linear manner on the second bearing member for pressing the second member against the first member for maintaining the dynamic and static seal.

* * * * *